United States Patent
Zheng et al.

(10) Patent No.: US 11,197,344 B2
(45) Date of Patent: *Dec. 7, 2021

(54) RADIO LINK CONTROL REASSEMBLING TECHNIQUES IN WIRELESS SYSTEMS

(71) Applicant: Qualcomm Incorporated, San Diego, CA (US)

(72) Inventors: Ruiming Zheng, Beijing (CN); Yu-Ting Yu, San Francisco, CA (US); Keiichi Kubota, Setagya-Ku (JP); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/638,110

(22) PCT Filed: Aug. 9, 2018

(86) PCT No.: PCT/CN2018/099621
§ 371 (c)(1),
(2) Date: Feb. 10, 2020

(87) PCT Pub. No.: WO2019/029619
PCT Pub. Date: Feb. 14, 2019

(65) Prior Publication Data
US 2020/0245400 A1    Jul. 30, 2020

(30) Foreign Application Priority Data

Aug. 11, 2017  (WO) ................ PCT/CN2017/097059

(51) Int. Cl.
*H04W 4/00* (2018.01)
*H04W 80/02* (2009.01)
(Continued)

(52) U.S. Cl.
CPC ........... *H04W 80/02* (2013.01); *H04L 1/1642* (2013.01); *H04W 28/065* (2013.01)

(58) Field of Classification Search
None
See application file for complete search history.

(56) References Cited

U.S. PATENT DOCUMENTS

2004/0203623 A1* 10/2004 Wu .................. H04L 1/188
455/412.1
2009/0143063 A1* 6/2009 Tseng ................. H04L 1/1832
455/422.1

(Continued)

FOREIGN PATENT DOCUMENTS

CN    101064587 A    10/2007
CN    101686494 A    3/2010

(Continued)

OTHER PUBLICATIONS

Huawei et al., "Assembly Timer for RLC Segments," R2-1702608, 3GPP TSG-RAN2 Meeting #97bis, Spokane, USA, Apr. 3-7, 2017, 3 pages.

(Continued)

*Primary Examiner* — Elisabeth Benoit Magloire
(74) *Attorney, Agent, or Firm* — Holland & Hart LLP

(57) ABSTRACT

Methods, systems, and devices for wireless communication are described. In some wireless communications systems, a transmitting device may identify a Radio Link Control (RLC) service data unit (SDU) to be transmitted to a receiving device. In some cases, the transmitting device may not have access to sufficient resources to transmit the entire RLC SDU. As such, the transmitting device may segment the RLC SDU into RLC SDU segments, and the transmitting device may transmit the RLC SDU segments to the receiving device. If an RLC layer at the receiving device receives one or more RLC SDU segments out of sequence, the RLC (Continued)

layer may initiate a reassembly (or reordering) timer. The RLC layer may reassemble the successfully received RLC SDU segments to be passed to upper layers. Once the timer expires, the RLC layer may declare that the missing RLC SDU segments are lost.

28 Claims, 8 Drawing Sheets

(51) Int. Cl.
  *H04L 1/16* (2006.01)
  *H04W 28/06* (2009.01)

(56) References Cited

U.S. PATENT DOCUMENTS

| | | | | |
|---|---|---|---|---|
| 2009/0203374 | A1* | 8/2009 | Chun | H04L 69/03 455/425 |
| 2010/0034095 | A1* | 2/2010 | Ho | H04L 1/1642 370/241 |
| 2010/0332936 | A1 | 12/2010 | Ji et al. | |
| 2011/0051664 | A1* | 3/2011 | Kim | H04L 1/1851 370/328 |
| 2012/0275399 | A1 | 11/2012 | Liu et al. | |
| 2014/0301188 | A1* | 10/2014 | Koskinen | H04L 47/34 370/230 |
| 2014/0301362 | A1* | 10/2014 | Koskinen | H04L 1/1838 370/331 |
| 2015/0304071 | A1* | 10/2015 | Koskinen | H04L 1/1848 370/331 |
| 2016/0219458 | A1* | 7/2016 | Kubota | H04W 28/0273 |
| 2017/0181207 | A1 | 6/2017 | Yi et al. | |
| 2017/0215218 | A1* | 7/2017 | Adachi | H04L 29/08 |
| 2018/0083688 | A1* | 3/2018 | Agiwal | H04W 12/033 |
| 2019/0288770 | A1* | 9/2019 | Martin | H04L 1/1832 |
| 2020/0213242 | A1 | 7/2020 | Zheng et al. | |
| 2020/0274651 | A1* | 8/2020 | Yi | H04W 28/065 |

FOREIGN PATENT DOCUMENTS

| | | |
|---|---|---|
| CN | 102104535 A | 6/2011 |
| CN | 107317760 A | 11/2017 |
| EP | 3136665 A1 | 3/2017 |
| TW | 201616843 A | 5/2016 |

OTHER PUBLICATIONS

International Search Report and Written Opinion—PCT/CN2017/097059—ISA/EPO—dated May 4, 2018.
International Search Report and Written Opinion—PCT/CN2018/099621—ISA/EPO—dated Nov. 8, 2018.
Qualcomm Inc: "E-mail Discussion Summary of RLC UM," R2-1706794, 3GPP TSG-RAN WG2 NR AdHoc, Qingdao, China, Jun. 27-Jun. 29, 2017, pp. 1-26.
Qualcomm Incorporated: "RLC UM Operation," R2-1708952, 3GPP TSG-RAN WG2 | Meeting #99, Berlin, Germany, Aug. 21-25, 2017, pp. 1-6.
Ericsson: "RLC UM Receiver Window Operation," 3GPP Draft, 3GPP TSG-RAN WG2 #98, R2-1704365—RLC UM Details for NR, 3rd Generation Partnership Project (3GPP), Mobile Competence Centre, 650, Route Des Lucioles, F-06921, Sophia-Antipolis Cedex, France, vol. RAN WG2. No. Hangzhou; 20170515-20170519, May 14, 2017 (May 14, 2017), XP051274939, pp. 1-6, Retrieved from the Internet: URL: http://www.3gpp.org/ftp/Meetings_3GPP_SYNC/RAN2/Docs/ [retrieved on May 14, 2017].paragraph [5.1.2.2.1], paragraph [5.1.2.2.2], paragraph [5.1.2.2.3], paragraph [07.1], paragraph [07.2].
Supplementary European Search Report—EP18844663—Search Authority—The Hague—dated Mar. 11, 2021.
Taiwan Search Report—TW107128024—TIPO—dated Aug. 20, 2021.

* cited by examiner

RADIO LINK CONTROL REASSEMBLING TECHNIQUES IN WIRELESS SYSTEMS

CROSS REFERENCES

The present 371 Application for Patent claims priority to International Patent Application No. PCT/CN2018/099621 to Zheng et al., entitled "RADIO LINK CONTROL REASSEMBLING TECHNIQUES IN WIRELESS SYSTEMS," filed Aug. 9, 2018 and to International Patent Application No. PCT/CN2017/097059 to Zheng et, al, entitled "RADIO LINK CONTROL REASSEMBLING TECHNIQUES IN WIRELESS SYSTEMS," filed Aug. 11, 2017, each of which is assigned to the assignee hereof.

BACKGROUND

The following relates generally to wireless communication and more specifically to Radio Link Control (RLC) reassembling techniques in wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system).

A wireless multiple-access communications system may include a number of base stations or access network nodes, each simultaneously supporting communication for multiple communication devices, which may be otherwise known as user equipment (UE). In some wireless communications systems, a transmitting device may process data at multiple layers of a layered protocol stack prior to transmitting the data to a receiving device. One example of a protocol layer is an RLC layer which may be used to connect upper layers of the protocol stack to lower layers of the protocol stack, in some examples, an RLC layer at a transmitting device may receive an RLC service data unit (SDU) from upper layers for further processing and for transmission to a receiving device.

In some cases, the transmitting device may not have access to sufficient resources to transmit the entire RLC SDU to the receiving device. Accordingly, the transmitting device may segment the RLC SDU into RLC SDU segments, and the transmitting device may transmit the RLC SDU segments to the receiving device on different resources. In such cases, when the receiving device receives only a portion of the entire RLC SDU (i.e., not all segments of the RLC SDU), the receiving device may not be able to determine whether the missing RLC SDU segments were lost in transmission or were not transmitted by the transmitting device. As such, the receiving device may not be able to process the received RLC SDU segments correctly, which may result in degraded communications in a wireless system.

SUMMARY

In some wireless communications systems, a transmitting device may identify a Radio Link Control (RLC) service data unit (SDU) to be transmitted to a receiving device. In some cases, the transmitting device may not have access to sufficient resources to transmit the entire RLC SDU. As such, the transmitting device may segment the RLC SDU into RLC SDU segments, and the transmitting device may transmit the RLC SDU segments to the receiving device. If an RLC layer at the receiving device receives one or more RLC SDU segments out of sequence, the RLC layer may initiate a reassembly (or reordering) timer. Once the timer expires, the RLC layer may declare that the missing RLC SDU segments are lost, and the RLC layer may reassemble the successfully received RLC SDU segments to be passed to upper layers.

A method for wireless communication is described. The method may include receiving, at an RLC layer, an RLC SDU segment of a protocol data unit (PDU), determining that a sequence number associated with the RLC SDU segment is greater than a value of a state variable corresponding to a highest sequence number associated with previously received PDUs or previously received RLC SDU segments, determining that buffered RLC SDU segments associated with the same sequence number as the received RLC SDU segment are received out of order, and updating the value of the state variable corresponding to the highest sequence number and initiating a reassembly timer based at least in part on the determination that the sequence number associated with the RLC SDU segment is greater than the value of the state variable and the determination that buffered RLC SDU segments associated with the same sequence number as the received RLC SDU segment are received out of order.

An apparatus for wireless communication is described. The apparatus may include means for receiving, at an RLC layer, an RLC SDU segment of a PDU, means for determining that a sequence number associated with the RLC SDU segment is greater than a value of a state variable corresponding to a highest sequence number associated with previously received PDUs or previously received RLC SDU segments, means for determining that buffered RLC SDU segments associated with the same sequence number as the received RLC SDU segment are received out of order, and means for updating the value of the state variable corresponding to the highest sequence number and initiating a reassembly timer based at least in part on the determination that the sequence number associated with the RLC SDU segment is greater than the value of the state variable and the determination that buffered RLC SDU segments associated with the same sequence number as the received RLC SDU segment are received out of order.

Another apparatus for wireless communication is described. The apparatus may include a processor, memory in electronic communication with the processor, and instructions stored in the memory. The instructions may be operable to cause the processor to receive, at an RLC layer, an RLC SDU segment of a PDU, determine that a sequence number associated with the RLC SDU segment is greater than a value of a state variable corresponding to a highest sequence number associated with previously received PDUs or previously received RLC SDU segments, determine that buffered RLC SDU segments associated with the same sequence number as the received RLC SDU segment are received out of order, and update the value of the state variable corresponding to the highest sequence number and initiating a reassembly timer based at least in part on the determination that the sequence number associated with the RLC SDU segment is greater than the value of the state variable and the determination that buffered RLC SDU segments associated with the same sequence number as the received RLC SDU segment are received out of order.

A non-transitory computer readable medium for wireless communication is described. The non-transitory computer-readable medium may include instructions operable to cause a processor to receive, at an RLC layer, an RLC SDU segment of a PDU, determine that a sequence number associated with the RLC SDU segment is greater than a value of a state variable corresponding to a highest sequence number associated with previously received PDUs or previously received RLC SDU segments, determine that buffered RLC SDU segments associated with the same sequence number as the received RLC SDU segment are received out of order, and update the value of the state variable corresponding to the highest sequence number and initiating a reassembly timer based at least in part on the determination that the sequence number associated with the RLC SDU segment is greater than the value of the state variable and the determination that buffered RLC SDU segments associated with the same sequence number as the received RLC SDU segment are received out of order.

In some examples of the method, apparatus, and non-transitory computer-readable medium described above, determining that buffered RLC SDU segments associated with the same sequence number as the received RLC SDU segment may be received out of order includes determining that a first byte of the sequence number associated with the received RLC SDU segment is not in a receive buffer at the RLC layer. In some examples of the method, apparatus, and non-transitory computer-readable medium described above, determining that buffered RLC SDU segments associated with the same sequence number as the received RLC SDU segment may be received out of order includes determining that the buffered RLC SDU segments with the same sequence number is not in consecutive byte order.

In some examples of the method, apparatus, and non-transitory computer-readable medium described above, updating the value of the state variable corresponding to the highest sequence number includes updating the value of the state variable corresponding to the highest sequence number with the sequence number associated with the RLC SDU segment or with a number greater than the sequence number associated with the RLC SDU segment. In some examples of the method, apparatus, and non-transitory computer-readable medium described above, the value of the state variable may be initially set to zero.

In some examples of the method, apparatus, and non-transitory computer-readable medium described above, determining that the sequence number associated with the RLC SDU segment may be greater than the value of the state variable corresponding to the highest sequence number includes determining that the sequence number associated with the RLC SDU segment may be greater than zero. In some examples of the method, apparatus, and non-transitory computer-readable medium described above, the reassembly timer includes a t-reassembly timer or a t-reordering timer.

DETAILED DESCRIPTION

Figure 1:
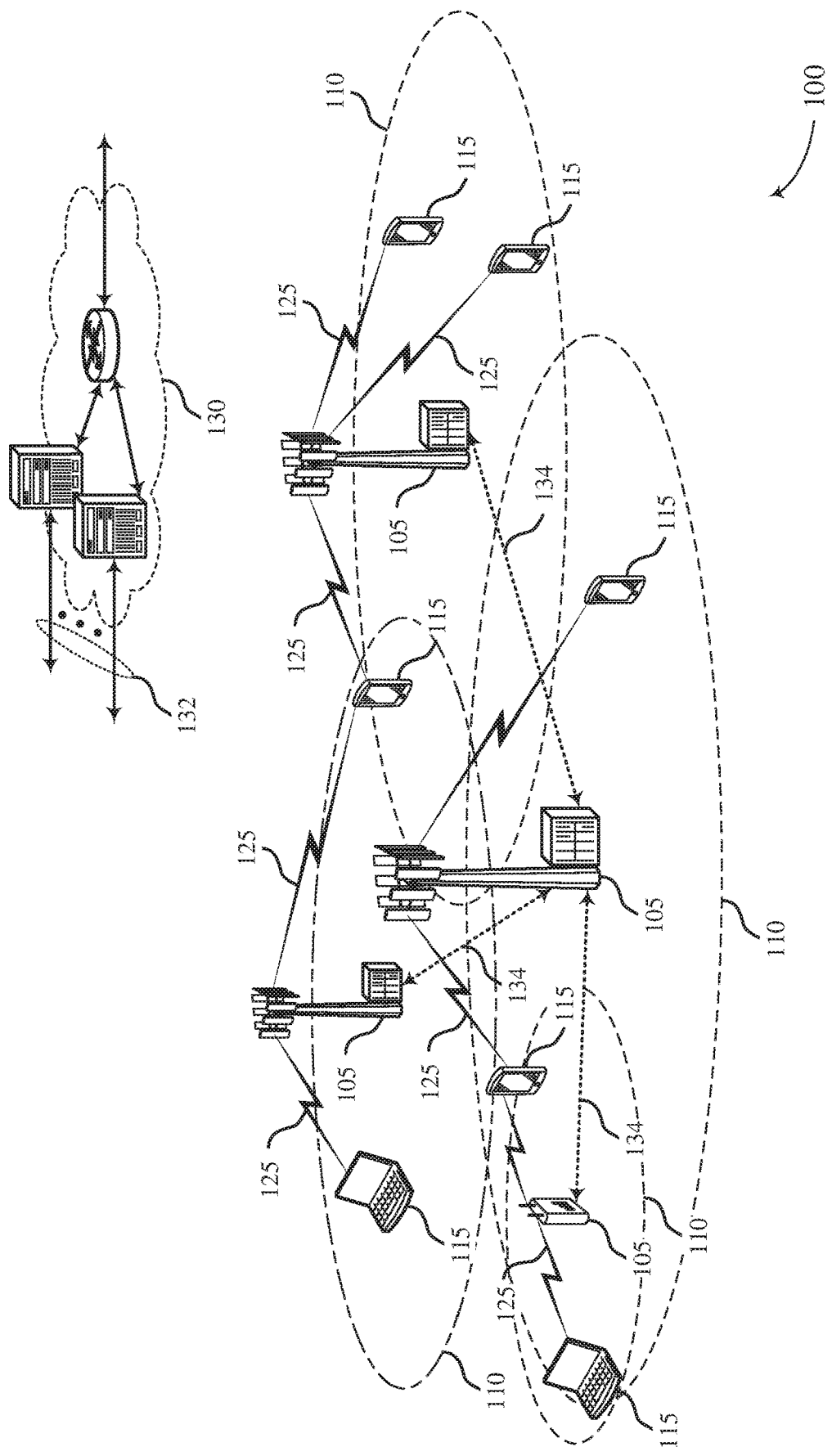
FIGS. 1 and 2 illustrate examples of wireless communications systems that support Radio Link Control (RLC) reassembling techniques in accordance with various aspects of the present disclosure.

Some wireless devices may support the use of protocol layers for processing data to be transmitted to another wireless device, or for processing data received from another wireless device. One example of a protocol layer may be a Radio Link Control (RLC) layer which may be used to perform packet segmentation and reassembly for communication over logical channels. In addition to the above functions, the RLC layer may be used to connect upper layers of a protocol stack to lower layers of the protocol stack. At a transmitting device, the RLC layer may receive RLC service data units (SDUs) from upper layers, process these SDUs to generate RLC protocol data units (PDUs), and pass the RLC PDUs to lower layers. At a receiving device, the RLC layer may receive RLC PDUs from lower layers, process these RLC PDUs to generate RLC SDUs, and pass the RLC SDUs to upper layers.

As an example, an RLC layer at a transmitting device may receive an RLC SDU from an upper layer for processing at the RLC layer and transmission to a receiving device (e.g., after further processing at lower layers). Once the RLC SDU is transmitted to the receiving device, the RLC layer at the receiving device may receive the RLC SDU and pass the RLC SDU to upper layers. In some cases, the receiving device may fail to receive the RLC SDU from the transmitting device. In such instances, the transmitting device may be triggered to retransmit the RLC SDU (e.g., based on the results of a poll request). However, the transmitting device may not have access to sufficient resources to retransmit the entire RLC SDU. As such, the transmitting device may transmit a segment of the RLC SDU to the receiving device.

When the RLC layer at the receiving device receives the RLC SDU segment from the transmitting device, the RLC layer may determine that the entire RLC SDU was not received. Accordingly, the receiving device may wait to receive the remaining segments of the RLC SDU before reassembling the RLC SDU to be passed to upper layers. To limit delays in the reassembly process and to detect reception failures, the RLC layer may utilize a reassembly timer that sets a maximum time for waiting to receive missing RLC SDU segments. Once the timer expires and the receiving device fails to receive the remaining RLC SDU segments, the RLC layer may declare that the remaining RLC SDU segments are lost, and the RLC layer may reassemble the successfully received RLC SDU segments to be passed to upper layers.

Because the transmitting device described above would have to transmit an entire RLC SDU before retransmitting an RLC SDU segment (e.g., in Long Term Evolution (LTE) systems), these techniques for detecting reception failures of RLC SDU segments may be acceptable. That is, the determination made by the receiving device that the remaining RLC SDU segments are lost may not be because the remaining RLC SDU segments have not been transmitted since the entire RLC SDU was transmitted before the RLC SDU segments were retransmitted.

In some other wireless communications systems (e.g., New Radio (NR) systems), a transmitting device may transmit a segment of an RLC SDU to a receiving device without first transmitting the entire RLC SDU to the receiving device (e.g., when the transmitting device does not have access to sufficient resources to transmit the entire RLC SDU Similar to the techniques described above, when the receiving device receives the RLC SDU segment, the receiving device may determine to wait to receive the remaining segments of the RLC SDU before reordering RLC SDU segments to be passed to upper layers. In such cases, however, if the receiving device uses a reassembly timer to set a maximum time to wait to receive missing RLC SDU segments, the receiving device may incorrectly declare that the remaining RLC SDU segments are lost after the timer expires, even when the remaining RLC SDU segments have not yet been transmitted by the transmitting device. As a result, a wireless communications system may experience degraded communications.

As described herein, a wireless communications system may support efficient techniques for triggering a reassembly timer to allow a receiving device to correctly detect reception failures and limit delays in the reassembly process. In one example, when a receiving device receives an RLC SDU segment, the receiving device may determine whether the RLC SDU segment is received out of sequence prior to initiating the reassembly timer. If the receiving device determines that the RLC SDU segment is received in sequence, the receiving device may refrain from initiating the reassembly timer. Alternatively, if the receiving device determines that the RLC SDU segment is received out of sequence, the receiving device may initiate the reassembly timer, and the receiving device may wait to receive the remaining RLC SDU segments until the timer expires. Because the transmitting device may transmit the RLC SDU segments in sequence, these techniques allow the receiving device to correctly determine whether the transmission of an RLC SDU segment was unsuccessful.

Aspects of the disclosure introduced above are described below in the context of a wireless communications system. Examples of processes and signaling exchanges that support RLC reassembling techniques in wireless systems are then described. Aspects of the disclosure are further illustrated by and described with reference to apparatus diagrams, system diagrams, and flowcharts that relate to RLC reassembling techniques in wireless systems.

FIG. 1 illustrates an example of a wireless communications system 100 that supports RLC reassembling techniques in accordance with various aspects of the present disclosure. The wireless communications system 100 includes base stations 105, UEs 115, and a core network 130. In some examples, the wireless communications system 100 may be an LTE network, an LTE-Advanced (LTE-A) network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface), Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

In some cases, UEs 115 and base stations 105 may support retransmissions of data to increase the likelihood that data is received successfully. Hybrid Automatic Repeat Request (HARQ) feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may be a packet-based network that operates according to a layered protocol stack. In the user plane, communications at the bearer or packet data convergence protocol (PDCP) layer may be IP-based, A Media Access Control (MAC) layer may perform priority handling and multiplexing of logical channels into transport channels. In some cases, the MAC layer may use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In addition to the above layers, the layered protocol stack may include an RLC layer which may connect upper layers (e.g., the PDCP layer) to lower layers (e.g., the MAC layer). Furthermore, the RLC layer may perform packet segmentation and reassembly to communicate over logical channels. As an example, if an incoming data packet (i.e., an RLC SDU) is too large for transmission (e.g., when limited resources are available), the RLC layer may segment it into several smaller RLC SDU segments. In such cases, when these RLC SDU segments are transmitted, and a receiving device fails to receive one or more of the RLC SDU segments, it may be challenging for the receiving device to process the successfully received RLC SDU segments correctly. A receiving device in wireless communications system 100 may support efficient techniques for processing successfully received RLC SDU segments and, in some aspects, requesting retransmission of missing RLC SDU segments from a transmitting device.

Figure 2:
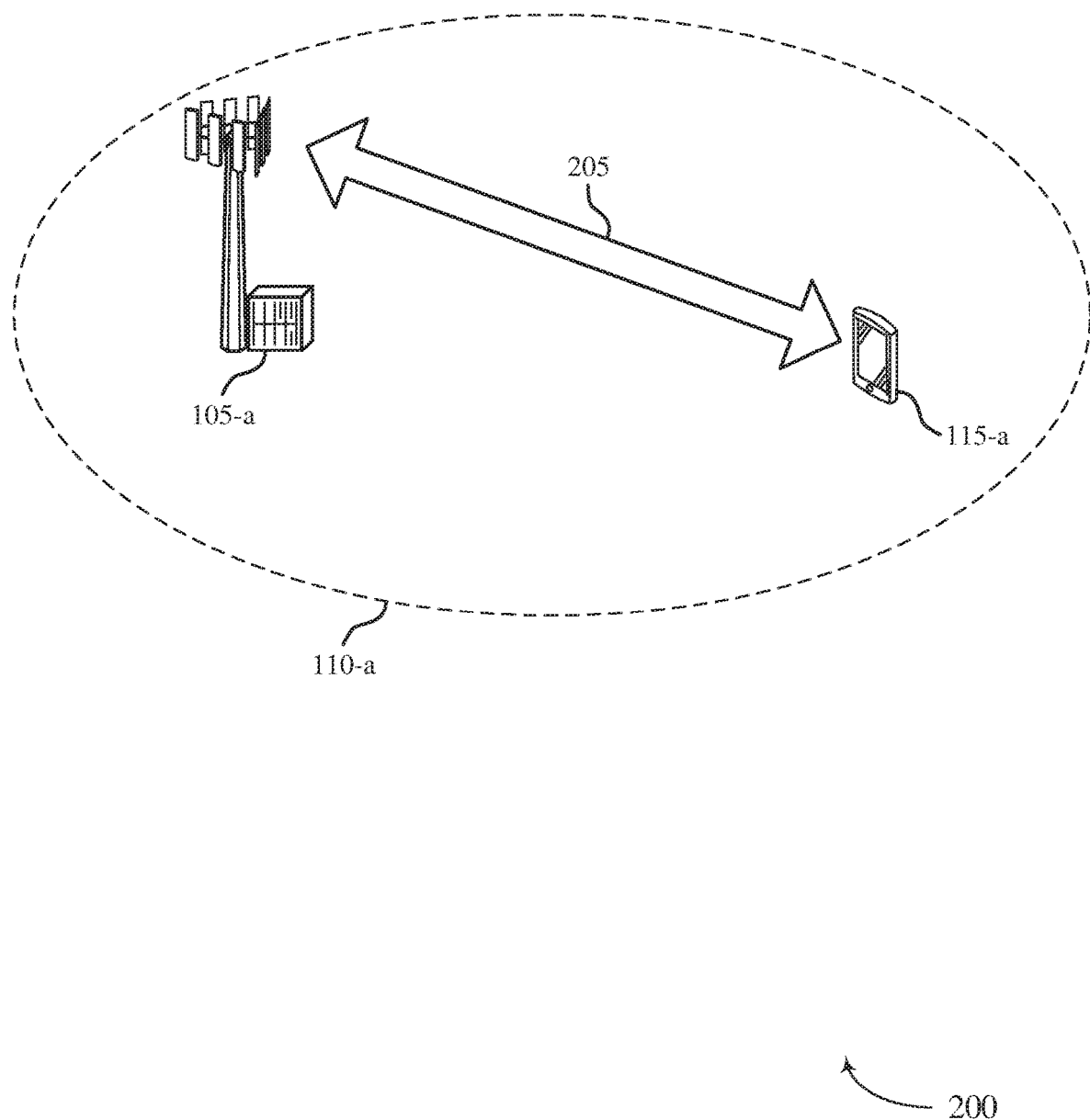

FIG. 2 illustrates an example of a wireless communications system 200 that supports RLC reassembling techniques in accordance with various aspects of the present disclosure. Wireless communications system 200 includes base station 105-a and UE 115-a, which may be examples of the corresponding devices described with reference to FIG. 1. Base station 105-a may provide communication coverage to UEs 115 within coverage area 110-a. Base station 105-a may communicate with UE 115-a on resources of a carrier 205. In some cases, base station 105-a and UE 115-a may operate using NR technology (e.g., via a millimeter-wave (mmW) spectrum).

Wireless communications system 200 may implement aspects of wireless communications system 100. For example, wireless communications system 200 may be a packet-based network that operates according to a layered protocol stack. Each protocol layer of the layered protocol stack may perform different functions to process data to be transmitted to another wireless device or to process data received from another wireless device. One example of a protocol layer may be an RLC layer which may be used to perform packet segmentation and reassembly for communication over logical channels. In addition to the above functions, the RLC layer may connect upper layers of a protocol stack and lower layers of the protocol stack.

At a transmitting device (e.g., base station 105-a or UE 115-a), the RLC layer may receive an RLC SDU from an upper layer (e.g., a PDCP layer), in some cases, the transmitting device may not have access to sufficient resources to transmit the entire RLC SDU. As such, the transmitting device may segment the RLC SDU and transmit multiple RLC SDU segments to a receiving device. When the RLC layer at the receiving device receives the RLC SDU segments from the transmitting device, the RLC layer may reassemble the RLC SDU segments received to generate the complete RLC SDU, and the RLC layer may pass the reassembled RLC SDU to an upper layer (e.g., a PDCP layer).

In some cases, however, the RLC layer at the receiving device may fail to receive one or more of the RLC SDU segments from a transmitting device. In such cases, the RLC layer at the receiving device may use the techniques described herein to determine whether to declare that the missing RLC SDU segments are lost and reassemble the successfully received RLC SDU segments to be passed to an upper layer. For example, the RLC layer may determine to initiate a reassembly timer that sets a maximum time for waiting to receive missing RLC SDU segments from the transmitting device based on whether the successfully received RLC SDU segments (e.g., stored in a buffer at the receiving device) are in sequence.

If the receiving device determines that the successfully received RLC SDU segments are in sequence, the receiving device may refrain from initiating the reassembly timer. That is, the receiving device may detect that the transmitting device may not have transmitted the remaining RLC SDU segments, and the receiving device may wait to receive these segments from the transmitting device. Alternatively, if the receiving device determines that the successfully received RLC SDU segments are out of sequence, the receiving device may initiate the reassembly timer. That is, since the transmitting device transmits the RLC SDU segments in sequence, the receiving device may determine that a missing RLC SDU segment was transmitted but not received if the successfully received RLC SDU segments are out of sequence. Once the reassembly timer expires, the receiving device may reassemble the successfully received RLC SDU segments and pass these segments to an upper layer.

FIGS. 3A-3D illustrate examples of RLC SDU segments 300-a, 300-b, 300-c, and 300-d, which may be generated by a transmitting device a base station or a UE) in accordance with various aspects of the present disclosure.

In these examples, an RLC layer at a transmitting device may segment an RLC SDU into multiple RLC SDU segments, and the transmitting device may transmit some or all of the RLC SDU segments to a receiving device. When the RLC layer at the receiving device receives one of the RLC SDU segments, the RLC layer may determine whether the RLC SDU segment has a sequence number that is greater than the value of a state variable corresponding to the highest sequence number associated with previously received PDUs or previously received RLC SDU segments. The value of the state variable may be initially set to zero.

If the RLC layer determines that a received RLC SDU segment has a sequence number that is greater than the value of the state variable described above, the RLC layer may further determine if there are any gaps in the RLC SDU segments received from the transmitting device. In some cases, the RLC layer may determine whether there are any gaps in the RLC SDU segments based on determining whether the buffered RLC SDU segments (e.g., associated with the same sequence number as the received RLC SDU segment) are in sequence or out of sequence. If the RLC layer determines that the received RLC SDU segment has a sequence number that is greater than the value of the state variable, and the RLC layer determines that there is a gap in the RLC SDU segments (e.g., the RLC SDU segments are out of sequence), the RLC layer may update the value of the state variable and initiate a reassembly timer. In some examples, the RLC layer may update the value of the state variable with the sequence number associated with the received RLC SDU segment or with a number greater than the sequence number associated with the received RLC SDU segment.

Figure 3A:
FIGS. 3A through 3D illustrate examples of RLC service data units (SDUs) generated by a transmitting device in accordance with various aspects of the present disclosure.

In the example of FIG. 3A, the RLC layer may determine that the buffered RLC SDU segments are in sequence since only the first RLC SDU segment 305-a is received. Accordingly, the RLC layer may refrain from updating the state variable and initiating the reassembly timer, and the RLC layer may wait to receive the remaining missing RLC SDU segment 310-a from the transmitting device.

Figure 3B:
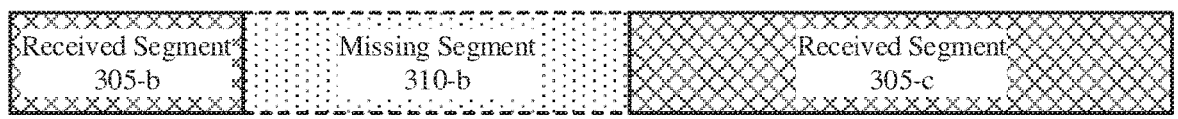

In the example of FIG. 3B, the RLC layer may determine that the buffered RLC SDU segments are out of sequence since the first RLC SDU segment 305-b and the third RLC SDU segment 305-c were received and the second RLC SDU segment 310-b is missing. That is, the RLC layer may determine that the buffered RLC SDU segments are out of sequence since the buffered RLC SDU segments with the same sequence number are not in consecutive byte order. Accordingly, the RLC layer may update the state variable and initiate the reassembly timer, and the RLC layer may wait to receive the missing RLC SDU segment 310-b from the transmitting device for the duration of the timer. Once the timer expires, the RLC layer may reassemble the successfully received RLC SDU segments and pass these segments to the layer above the RLC layer.

Figure 3C:
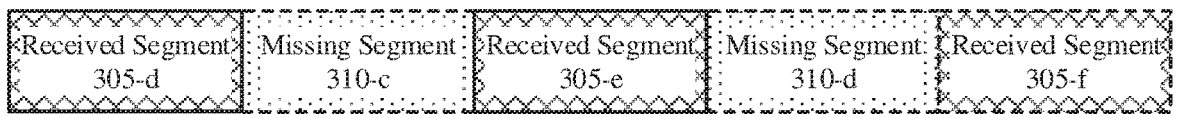

In the example of FIG. 3C, the RLC layer may determine that the buffered RLC SDU segments are out of sequence since the first RLC SDU segment 305-d, the third RLC SDU segment 305-e, and the fifth RLC SDU segment 305-f were received and the second RLC SDU segment 310-c and the fourth RLC SDU segment 310-d are missing. That is, the RLC layer may determine that the buffered RLC SDU segments are out of sequence since the buffered RLC SDU segments with the same sequence number are not in consecutive byte order. Accordingly, the RLC layer may update the state variable and initiate the reassembly timer, and the RLC layer may wait to receive the missing RLC SDU segments (i.e., the second RLC SDU segment 310-c and the fourth RLC SDU segment 310-d) from the transmitting device for the duration of the timer. Once the timer expires, the RLC layer may reassemble the successfully received RLC SDU segments and pass these segments to the layer above the RLC layer. In this example, although multiple RLC SDU segments may be missing, the RLC layer may initiate a single reassembly timer.

Figure 3D:

In the example of FIG. 3D, the RLC layer may determine that the buffered RLC SDU segments are out of sequence since the second RLC SDU segment 305-g was received and the first RLC SDU segment 310-e is missing. That is, the RLC layer may determine the received RLC SDU segment 305-g, which may be stored in the buffer after reception, is received prior to the RLC SDU segment 310-e that contains the first byte of the RLC SDU. Accordingly, the RLC layer may update the state variable and initiate the reassembly timer, and the RLC layer may wait to receive the missing RLC SDU segments (i.e., the first RLC SDU segment 310-e) from the transmitting device for the duration of the timer. The RLC layer may reassemble the successfully received RLC SDU segments and pass these segments to the layer above the RLC layer. If the RLC SDU segment 310-e is not received prior to expiration of the reassembly timer, the RLC layer may determine to discard the received RLC SDU segment 305-g (and all other unassembled RLC SDU segments in the buffer).

Although the examples described above discuss updating the state variable and initiating the reassembly timer when the RLC layer at a receiving device detects a gap in the buffered RLC SDU segments (e.g., the buffered SDU segments are out of sequence), the RLC layer may, in other examples, be configured to update the state variable and initiate the reassembly timer without detecting a gap in the buffered RLC SDU segments. For example, the RLC layer may update the state variable and initiate the reassembly timer after determining that the received RLC SDU segment has a sequence number that is greater than the value of the state variable regardless of whether there are any gaps in the buffered RLC SDU segments. In these examples, the complexity of the reassembly process may be reduced. However, these techniques may cause false alarms when, for example, an RLC layer reports, to a transmitting device, whether an RLC SDU segment was received.

Figure 4:
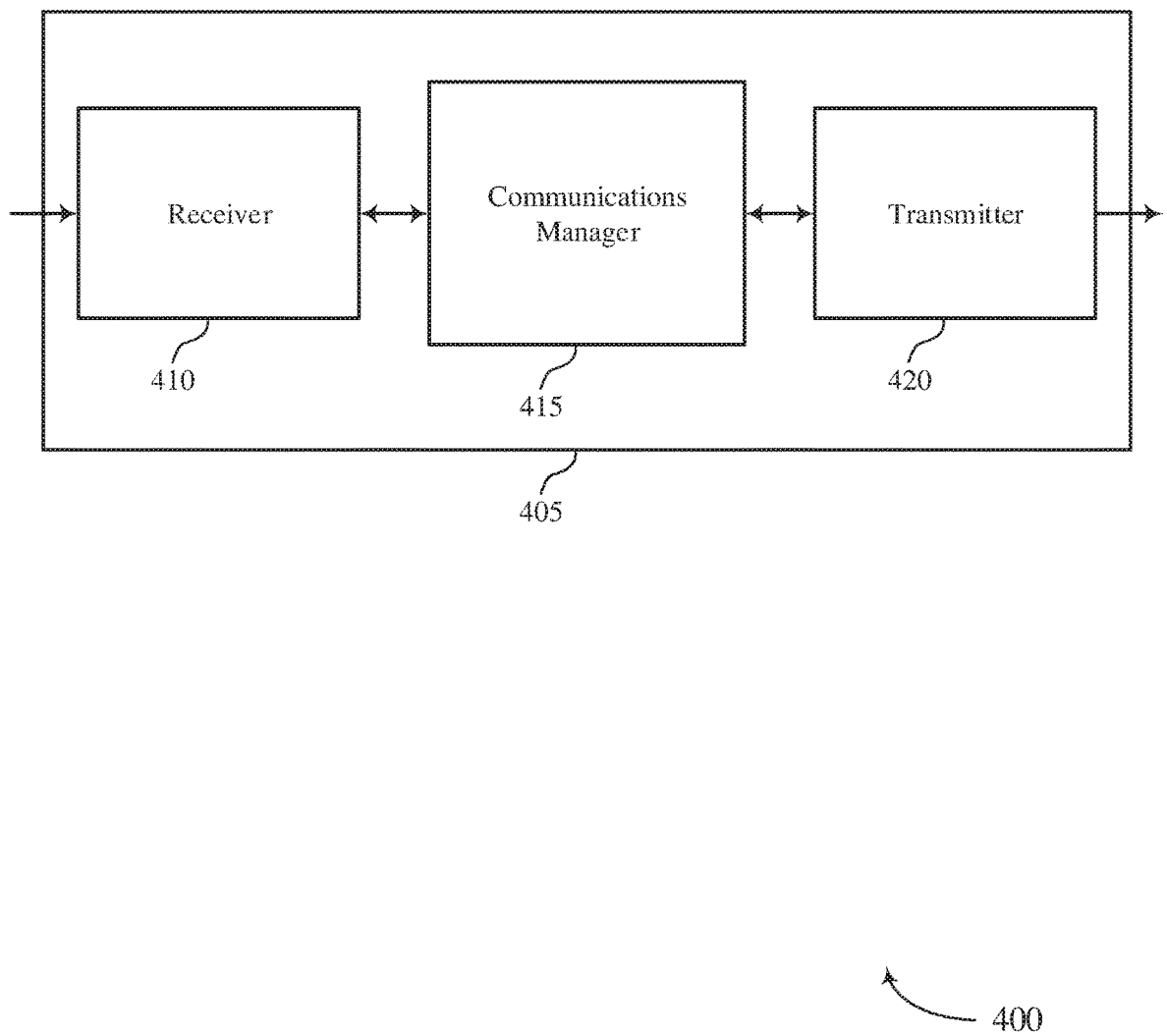
FIGS. 4 and 5 show block diagrams of a device that supports RLC reassembling techniques in wireless systems in accordance with various aspects of the present disclosure.

FIG. 4 shows a block diagram 400 of a wireless device 405 that supports RLC reassembling techniques in wireless systems in accordance with aspects of the present disclosure. Wireless device 405 may be an example of aspects of a UE 115 or base station 105 as described herein. Wireless device 405 may include receiver 410, communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to RLC reassembling techniques in wireless systems, etc.). Information may be passed on to other components of the device. The receiver 410 may be an example of aspects of the transceiver 635 or the transceiver 735 described with reference to FIGS. 6 and 7. The receiver 410 may utilize a single antenna or a set of antennas.

Communications manager 415 may be an example of aspects of the UE communications manager 615 or base station communications manager 715 described with reference to FIGS. 6 and 7. Communications manager 415 and/or at least some of its various sub-components may be implemented in hardware, software executed by a processor, firmware, or any combination thereof. If implemented in software executed by a processor, the functions of the communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 415 and/or at least some of its various sub-components may be physically located at various positions, including being distributed such that portions of functions are implemented at different physical locations by one or more physical devices. In some examples, communications manager 415 and/or at least some of its various sub-components may be a separate and distinct component in accordance with various aspects of the present disclosure. In other examples, communications manager 415 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Communications manager 415 may receive, at an RLC layer, an RLC SDU segment of a PDU, determine that a sequence number associated with the RLC SDU segment is greater than a value of a state variable corresponding to a highest sequence number associated with previously received PDUs or previously received RLC SDU segments, determine that buffered RLC SDU segments associated with the same sequence number as the received RLC SDU segment are received out of order, and update the value of the state variable corresponding to the highest sequence number and initiate a reassembly timer based on the determination that the sequence number associated with the RLC SDU segment is greater than the value of the state variable and the determination that buffered RLC SDU segments associated with the same sequence number as the received RLC SDU segment are received out of order.

Transmitter 420 may transmit signals generated by other components of the device. In some examples, the transmitter 420 may be collocated with a receiver 410 in a transceiver module. For example, the transmitter 420 may be an example of aspects of the transceiver 635 or transceiver 735 described with reference to FIGS. 6 and 7. The transmitter 420 may utilize a single antenna or a set of antennas.

Figure 5:
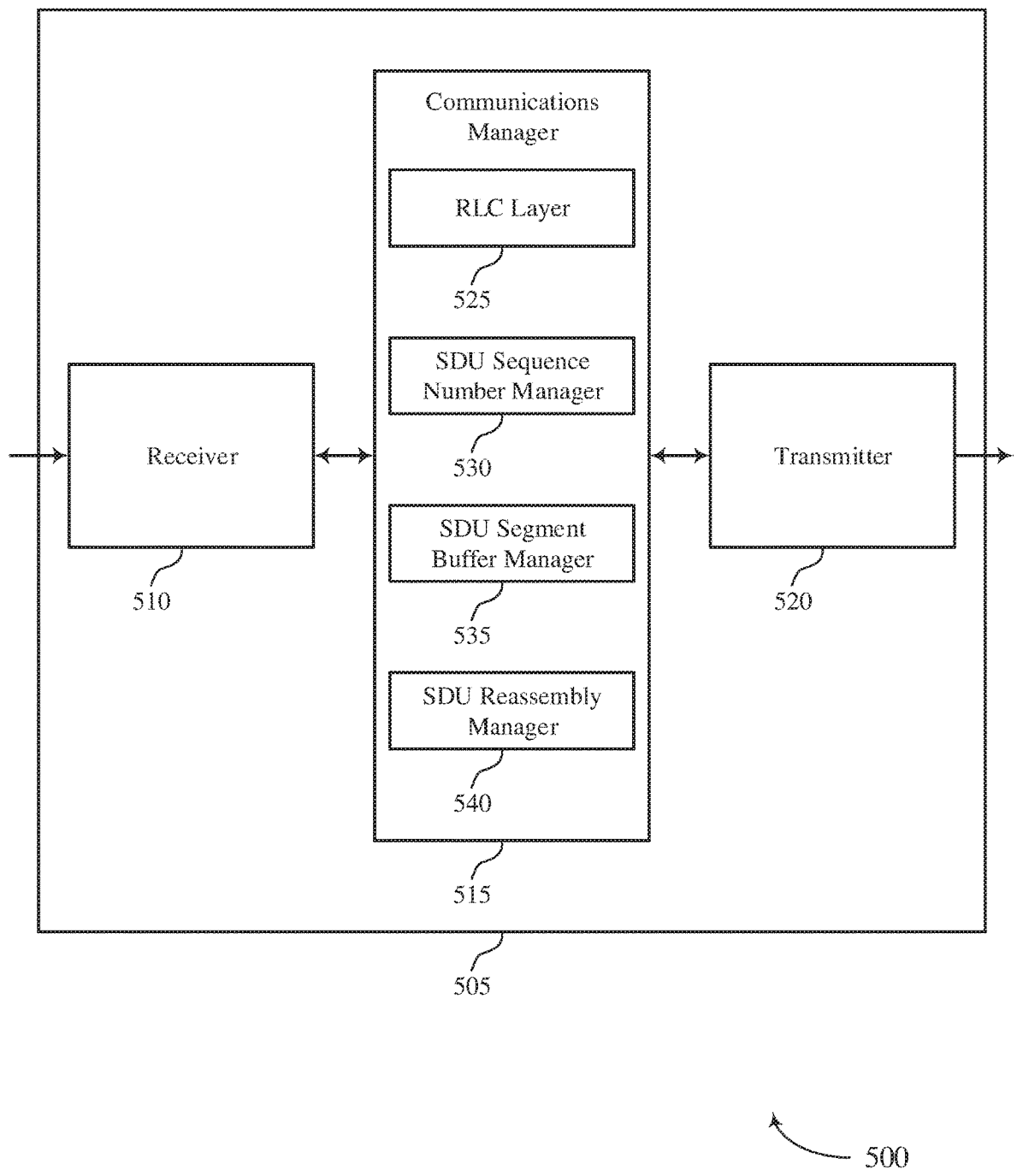

FIG. 5 shows a block diagram 500 of a wireless device 505 that supports RLC reassembling techniques in wireless systems in accordance with aspects of the present disclosure. Wireless device 505 may be an example of aspects of a wireless device 405 or a UE 115 or base station 105 as described with reference to FIG. 4. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to RLC reassembling techniques in wireless systems, etc.). Information may be passed on to other components of the device. The receiver 510 may be an example of aspects of the transceiver 635 or transceiver 735 described with reference to FIGS. 6 and 7. The receiver 510 may utilize a single antenna or a set of antennas.

Communications manager 515 may be an example of aspects of the UE communications manager 615 or the base station communications manager 715 described with reference to FIGS. 6 and 7. Communications manager 515 may include RLC layer 525, SDU sequence number manager 530, SDU segment buffer manager 535, and SDU reassembly manager 540. RLC layer 525 may receive an RLC SDU segment of a PDU.

SDU sequence number manager 530 may determine that a sequence number associated with the PIC SDU segment is greater than a value of a state variable corresponding to a highest sequence number associated with previously received. PDUs or previously received RLC SDU segments. In some cases, the value of the state variable is initially set to zero. In some examples, determining that the sequence number associated with the RLC SDU segment is greater than the value of the state variable corresponding to the highest sequence number includes determining that the sequence number associated with the RLC SDU segment is greater than zero.

SDU segment buffer manager 535 may determine that buffered RLC SDU segments associated with the same sequence number as the received RLC SDU segment are received out of order. In some cases, determining that buffered PLC SDU segments associated with the same sequence number as the received RLC SDU segment are received out of order includes determining that a first byte of the sequence number associated with the received RLC SDU segment is not in a receive buffer at the RLC layer. In some examples, determining that buffered RLC SDU segments associated with the same sequence number as the received RLC SDU segment are received out of order includes determining that the buffered RLC SDU segments with the same sequence number are not in consecutive byte order.

SDU reassembly manager 540 may update the value of the state variable corresponding to the highest sequence number and initiating a reassembly timer based on the determination that the sequence number associated with the RLC SDU segment is greater than the value of the state variable and the determination that buffered RLC SDU segments associated with the same sequence number as the received RLC SDU segment are received out of order. In some cases, updating the value of the variable corresponding to the highest sequence number includes updating the value of the variable corresponding to the highest sequence number with the sequence number associated with the RLC SDU segment or with a number greater than the sequence number associated with the RLC SDU segment. In some examples, the reassembly timer includes a t-reassembly timer or a t-reordering timer.

Transmitter 520 may transmit signals generated by other components of the device. In some examples, the transmitter 520 may be collocated with a receiver 510 in a transceiver module. For example, the transmitter 520 may be an example of aspects of the transceiver 635 or transceiver 735 described with reference to FIGS. 6 and 7, The transmitter 520 may utilize a single antenna or a set of antennas.

Figure 6:
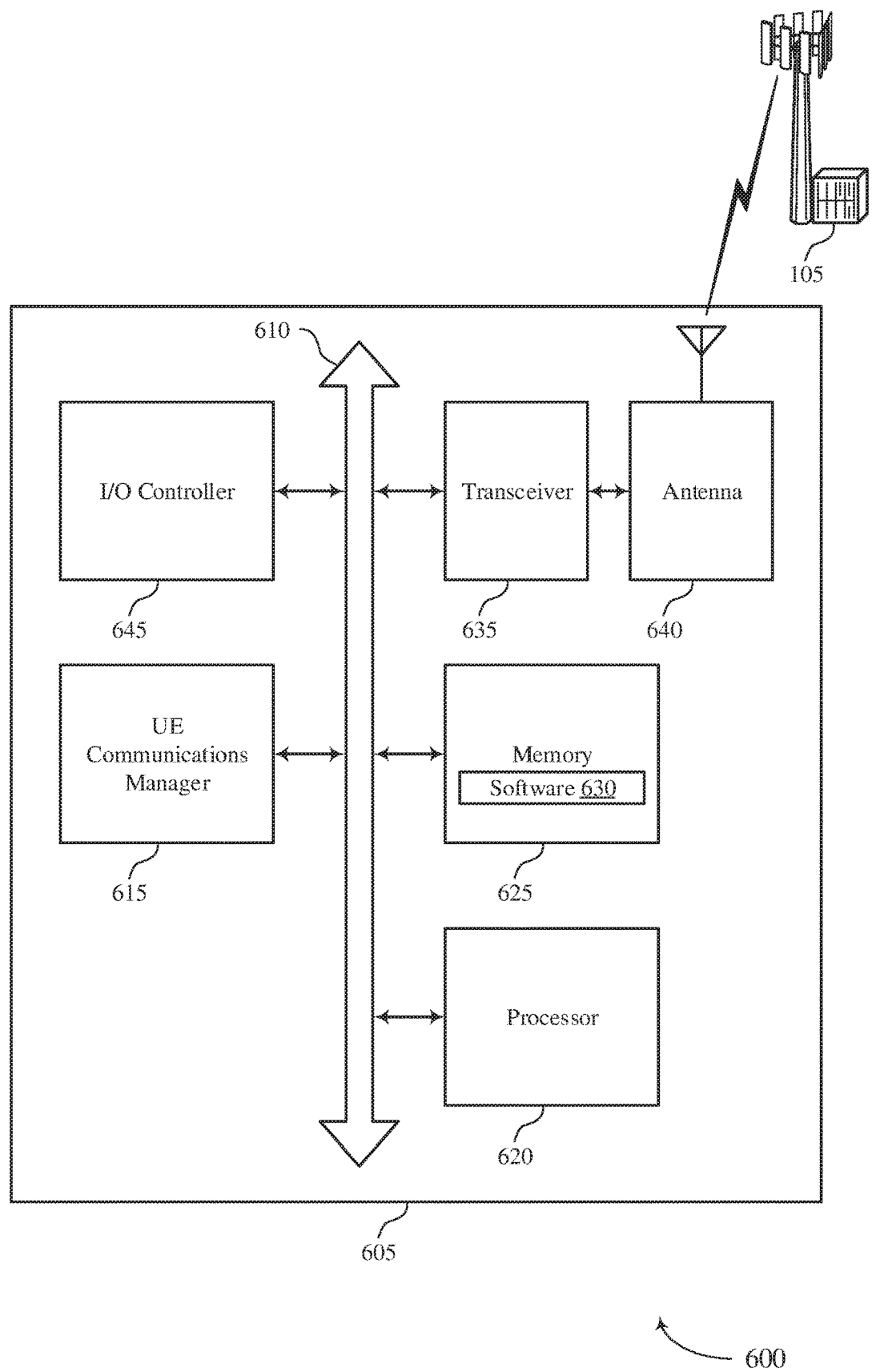
FIG. 6 illustrates a block diagram of a system including a user equipment (UE) that supports RLC reassembling techniques in wireless systems in accordance with various aspects of the present disclosure.

FIG. 6 shows a diagram of a system 600 including a device 605 that supports RLC reassembling techniques in wireless systems in accordance with aspects of the present disclosure. Device 605 may be an example of or include the components of wireless device 405, wireless device 505, or a UE 115 as described above, e.g., with reference to FIGS. 4 and 5. Device 605 may include components for bi-directional voice and data communications including components for transmitting and receiving communications, including UE communications manager 615, processor 620, memory 625, software 630, transceiver 635, antenna 640, and I/O controller 645. These components may be in electronic communication via one or more buses (e.g., bus 610). Device 605 may communicate wirelessly with one or more base stations 105.

Processor 620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof), In some cases, processor 620 may be configured to operate a memory array using a memory controller. In other cases, a memory controller may be integrated into processor 620. Processor 620 may be configured to execute computer-readable instructions stored in a memory to perform various functions (e.g., functions or tasks supporting RLC reassembling techniques in wireless systems).

Memory 625 may include random access memory (RAM) and read only memory (ROM). The memory 625 may store computer-readable, computer-executable software 630 including instructions that, when executed, cause the processor to perform various functions described herein. In some cases, the memory 625 may contain, among other things, a basic input/output system (BIOS) which may control basic hardware or software operation such as the interaction with peripheral components or devices.

Software 630 may include code to implement aspects of the present disclosure, including code to support RLC reassembling techniques in wireless systems. Software 630 may be stored in a non-transitory computer-readable medium such as system memory or other memory. In some cases, the software 630 may not be directly executable by the processor but may cause a computer (e.g., when compiled and executed) to perform functions described herein.

Transceiver 635 may communicate bi-directionally, via one or more antennas, wired, or wireless links as described above. For example, the transceiver 635 may represent a wireless transceiver and may communicate bi-directionally with another wireless transceiver. The transceiver 635 may also include a modem to modulate the packets and provide the modulated packets to the antennas for transmission, and to demodulate packets received from the antennas.

In some cases, the wireless device may include a single antenna 640. However, in some cases the device may have more than one antenna 640, which may be capable of concurrently transmitting or receiving multiple wireless transmissions.

I/O controller 645 may manage input and output signals for device 605. I/O controller 645 may also manage peripherals not integrated into device 605. In some cases, I/O controller 645 may represent a physical connection or port to an external peripheral. In some cases, I/O controller 645 may utilize an operating system such as iOS®, ANDROID®, MS-DOS®, MS-WINDOWS®, OS/2®, UNIX®, LINUX®, or another known operating system. In other cases, I/O controller 645 may represent or interact with a modem, a keyboard, a mouse, a touchscreen, or a similar device. In some cases, I/O controller 645 may be implemented as part of a processor. In some cases, a user may interact with device 605 via I/O controller 645 or via hardware components controlled by I/O controller 645.

Figure 7:
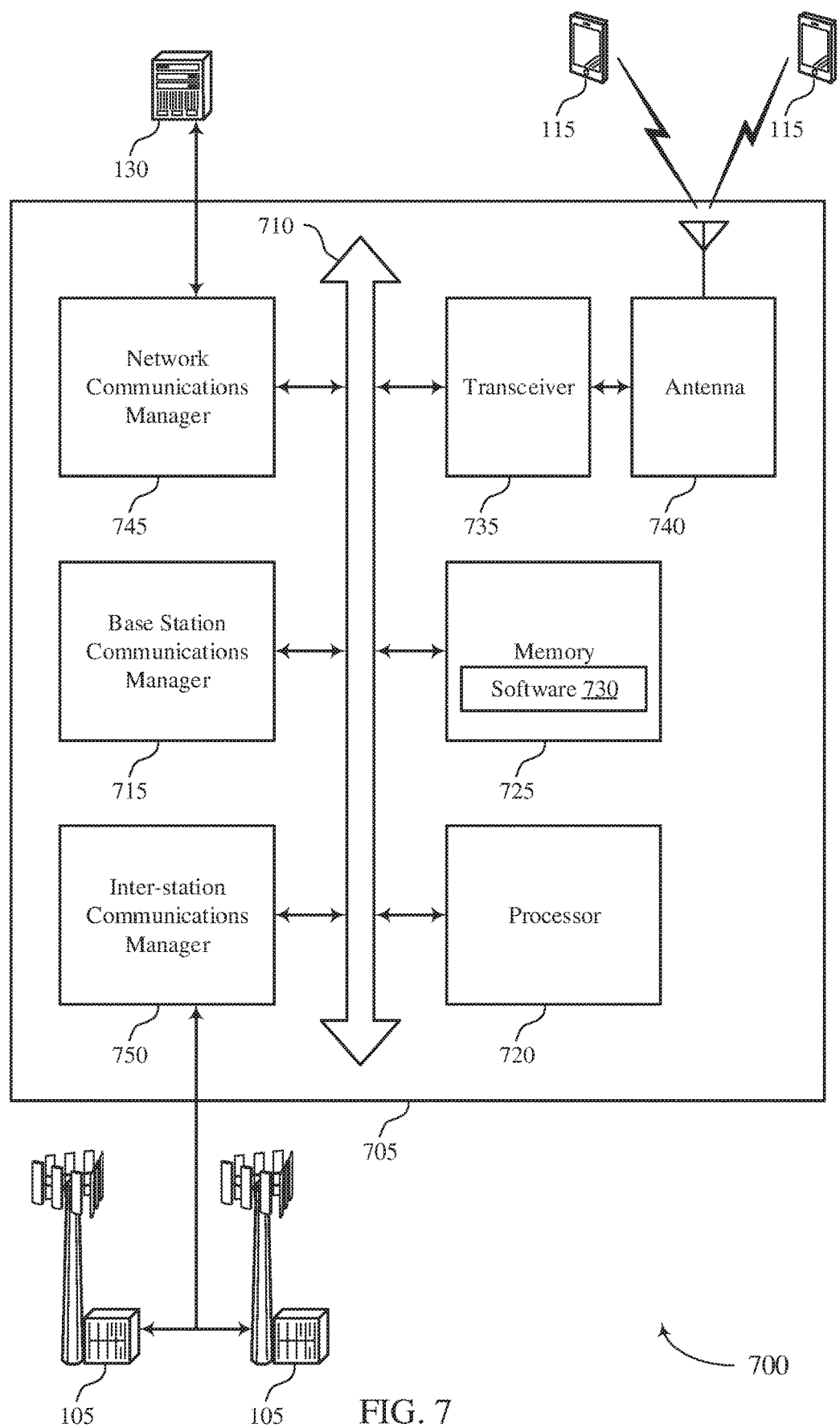
FIG. 7 illustrates a block diagram of a system including a base station that supports RLC reassembling techniques in wireless systems in accordance with various aspects of the present disclosure.

FIG. 7 shows a diagram of a system 700 including a device 705 that supports RLC reassembling techniques in wireless systems in accordance with aspects of the present disclosure. Device 705 may be an example of or include the components of wireless device 405, wireless device 505, or a base station 105 as described above, e.g., with reference to FIGS. 4 and 5. Device 705 may include components for bi-directional voice and data communications including components for transmitting and receiving communications, including base station communications manager 715, processor 720, memory 725, software 730, transceiver 735, antenna 740, network communications manager 745, and inter-station communications manager 750. These components may be in electronic communication via one or more buses (e.g., bus 710). Device 705 may communicate wirelessly with one or more UEs 115.

Processor 720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting RLC reassembling techniques in wireless systems).

Memory 725 may include RAM and ROM. The memory 725 may store computer-readable, computer-executable software 730 including instructions that, when executed, cause the processor to perform various functions described herein. In some cases, the memory 725 may contain, among other things, a BIOS which may control basic hardware or software operation such as the interaction with peripheral components or devices.

Software 730 may include code to implement aspects of the present disclosure, including code to support RLC reassembling techniques in wireless systems. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

Network communications manager 745 may manage communications with the core network (e.g., via one or more wired backhaul links). For example, the network communications manager 745 may manage the transfer of data communications for client devices, such as one or more UEs 115.

Inter-station communications manager 750 may manage communications with other base stations 105, and may include a controller or scheduler for controlling communications with UEs 115 in cooperation with other base stations 105, For example, the inter-station communications manager 750 may coordinate scheduling for transmissions to UEs 115 for various interference mitigation techniques such as beamforming or joint transmission. In some examples, inter-station communications manager 750 may provide an X2 interface within an LTE/LTE-A wireless communication network technology to provide communication between base stations 105.

Figure 8:
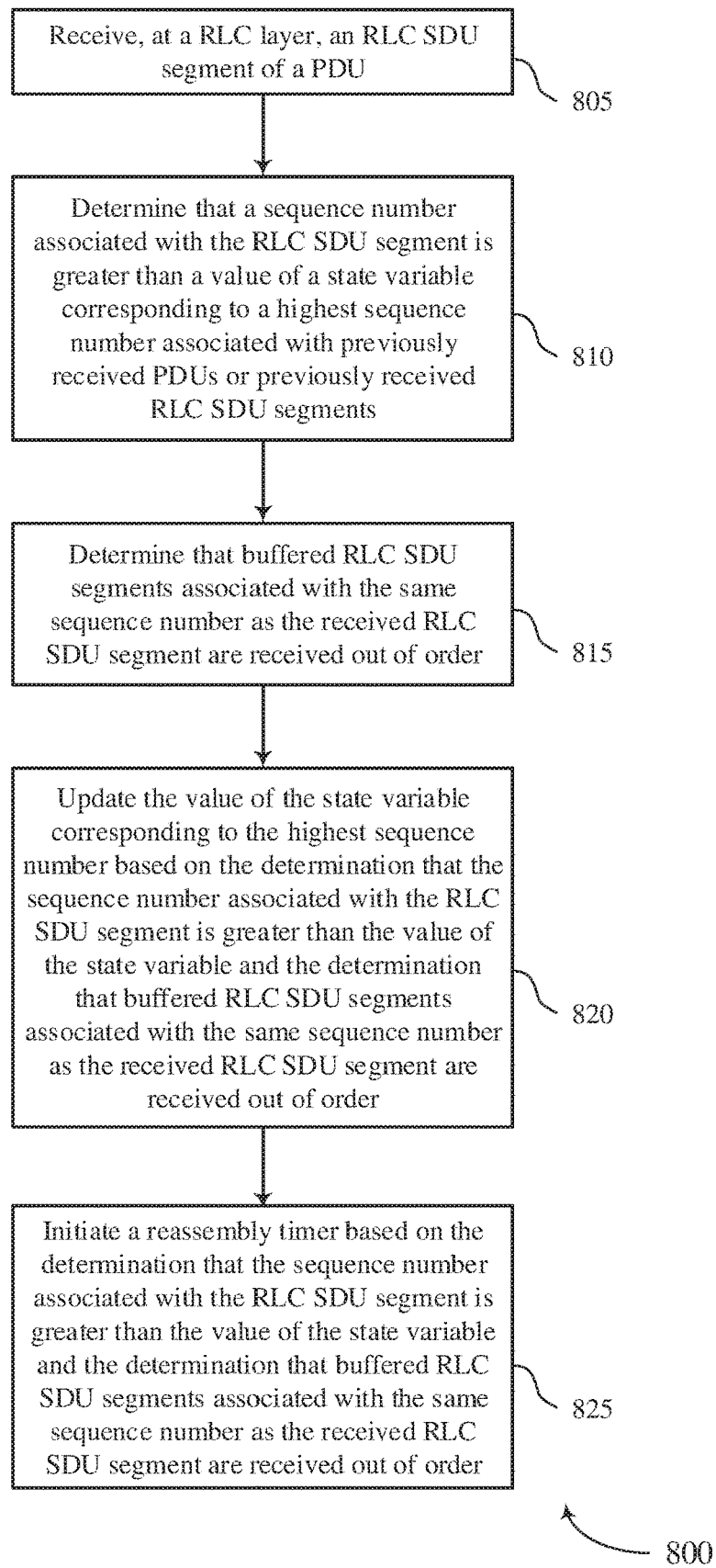
FIG. 8 illustrates a method in a system that supports RLC reassembling techniques in accordance with various aspects of the present disclosure.

FIG. 8 shows a flowchart illustrating a method 800 for RLC reassembling techniques in wireless systems in accordance with aspects of the present disclosure. The operations of method 800 may be implemented by a UE 115 or base station 105 or its components as described herein. For example, the operations of method 800 may be performed by a communications manager as described with reference to FIGS. 4 and 5. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 805, the UE 115 or base station 105 may receive, at an RLC layer, an RLC SDU segment of a PDU. The operations at 805 may be performed according to the methods described herein. In certain examples, aspects of the operations at 805 may be performed by an RLC layer as described with reference to FIG. 5.

At 810, the UE 115 or base station 105 may determine that a sequence number associated with the RLC SDU segment is greater than a value of a state variable corresponding to a highest sequence number associated with previously received PDUs or previously received RLC SDU segments. The operations at 810 may be performed according to the methods described herein. In certain examples, aspects of the operations at 810 may be performed by a SDU sequence number manager as described with reference to FIG. 5.

At 815, the UE 115 or base station 105 may determine that buffered RLC SDU segments associated with the same sequence number as the received RLC SDU segment are received out of order. The operations at 815 may be performed according to the methods described herein. In certain examples, aspects of the operations at 815 may be performed by a SDU segment buffer manager as described with reference to FIG. 5.

At 820, the UE 115 or base station 105 may update the value of the state variable corresponding to the highest sequence number based at least in part on the determination that the sequence number associated with the RLC SDU segment is greater than the value of the state variable and the determination that buffered RLC SDU segments associated with the same sequence number as the received RLC SDU segment are received out of order. The operations at 820 may be performed according to the methods described herein. In certain examples, aspects of the operations at 820 may be performed by a SDU reassembly manager as described with reference to FIG. 5.

At 825, the UE 115 or base station 105 may initiate a reassembly timer based at least in part on the determination that the sequence number associated with the RLC SDU segment is greater than the value of the state variable and the determination that buffered RLC SDU segments associated with the same sequence number as the received RLC SDU segment are received out of order. The operations at 825 may be performed according to the methods described herein, in certain examples, aspects of the operations at 825 may be performed by a SDU reassembly manager as described with reference to FIG. 5.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (TDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards, IS-2000 Releases may be commonly referred to as CDMA2000 1x, 1x, etc. IS-856 (TIA-856) is commonly referred to as CDMA2000 1xEV-DO, High Rate Packet Data (HRH)), etc. UTRA includes Wideband CDMA (WCDMA) and other variants of CDMA, A TDMA system may implement a radio technology such as Global System for Mobile Communications (GSM).

OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples, A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein. the timer expires, the RLC layer may declare that the missing RLC SDU segments are lost.

What is claimed is:

1. A method for wireless communication, comprising:
   receiving, at a radio link control (RLC) layer, an RLC service data unit (SDU) segment of a protocol data unit (PDU);
   determining that a sequence number associated with the RLC SDU segment is greater than a value of a state variable corresponding to a highest sequence number associated with previously received PDUs or previously received RLC SDU segments;
   determining that buffered RLC SDU segments associated with the same sequence number as the received RLC SDU segment are received out of order; and
   updating the value of the state variable corresponding to the highest sequence number and initiating a reassembly timer based at least in part on the determination that the sequence number associated with the RLC SDU segment is greater than the value of the state variable and the determination that buffered RLC SDU segments associated with the same sequence number as the received RLC SDU segment are received out of order.

2. The method of claim 1, wherein determining that buffered RLC SDU segments associated with the same sequence number as the received RLC SDU segment are received out of order comprises:
   determining that a first byte of the sequence number associated with the received RLC SDU segment is not in a receive buffer at the RLC layer.

3. The method of claim 1, wherein determining that buffered RLC SDU segments associated with the same sequence number as the received RLC SDU segment are received out of order comprises:
   determining that the buffered RLC SDU segments with the same sequence number are not in consecutive byte order.

4. The method of claim 1, wherein updating the value of the state variable corresponding to the highest sequence number comprises:
   updating the value of the state variable corresponding to the highest sequence number with the sequence number associated with the RLC SDU segment or with a number greater than the sequence number associated with the RLC SDU segment.

5. The method of claim 4, wherein the value of the state variable is initially set to zero.

6. The method of claim 5, wherein determining that the sequence number associated with the RLC SDU segment is greater than the value of the state variable corresponding to the highest sequence number comprises:
   determining that the sequence number associated with the RLC SDU segment is greater than zero.

7. The method of claim 1, wherein the reassembly timer comprises a t-reassembly timer or a t-reordering timer.

8. An apparatus for wireless communication, comprising:
   means for receiving, at a radio link control (RLC) layer, an RLC service data unit (SDU) segment of a protocol data unit (PDU);
   means for determining that a sequence number associated with the RLC SDU segment is greater than a value of a state variable corresponding to a highest sequence number associated with previously received PDUs or previously received RLC SDU segments;
   means for determining that buffered RLC SDU segments associated with the same sequence number as the received RLC SDU segment are received out of order; and
   means for updating the value of the state variable corresponding to the highest sequence number and initiating a reassembly timer based at least in part on the determination that the sequence number associated with the RLC SDU segment is greater than the value of the state variable and the determination that buffered RLC SDU segments associated with the same sequence number as the received RLC SDU segment are received out of order.

9. The apparatus of claim 8, wherein the means for determining that buffered RLC SDU segments associated with the same sequence number as the received RLC SDU segment are received out of order comprises:
   means for determining that a first byte of the sequence number associated with the received RLC SDU segment is not in a receive buffer at the RLC layer.

10. The apparatus of claim 8, wherein the means for determining that buffered RLC SDU segments associated with the same sequence number as the received RLC SDU segment are received out of order comprises:
    means for determining that the buffered RLC SDU segments with the same sequence number are not in consecutive byte order.

11. The apparatus of claim 8, wherein the means for updating the value of the state variable corresponding to the highest sequence number comprises:
    means for updating the value of the state variable corresponding to the highest sequence number with the sequence number associated with the RLC SDU segment or with a number greater than the sequence number associated with the RLC SDU segment.

12. The apparatus of claim 11, wherein the value of the state variable is initially set to zero.

13. The apparatus of claim 12, wherein the means for determining that the sequence number associated with the RLC SDU segment is greater than the value of the state variable corresponding to the highest sequence number comprises:
    means for determining that the sequence number associated with the RLC SDU segment is greater than zero.

14. The apparatus of claim 8, wherein the reassembly timer comprises a t-reassembly timer or a t-reordering timer.

15. An apparatus for wireless communication, comprising:
    a processor;
    memory in electronic communication with the processor; and
    instructions stored in the memory and operable, when executed by the processor, to cause the apparatus to:
    receive, at a radio link control (RLC) layer, an RLC service data unit (SDU) segment of a protocol data unit (PDU);
    determine that a sequence number associated with the RLC SDU segment is greater than a value of a state variable corresponding to a highest sequence number associated with previously received PDUs or previously received RLC SDU segments;

determine that buffered RLC SDU segments associated with the same sequence number as the received RLC SDU segment are received out of order; and update the value of the state variable corresponding to the highest sequence number and initiate a reassembly timer based at least in part on the determination that the sequence number associated with the RLC SDU segment is greater than the value of the state variable and the determination that buffered RLC SDU segments associated with the same sequence number as the received RLC SDU segment are received out of order.

16. The apparatus of claim 15, wherein the instructions are further executable by the processor to cause the apparatus to:

determine that a first byte of the sequence number associated with the received RLC SDU segment is not in a receive buffer at the RLC layer.

17. The apparatus of claim 15, wherein the instructions are further executable by the processor to cause the apparatus to:

determine that the buffered RLC SDU segments with the same sequence number are not in consecutive byte order.

18. The apparatus of claim 15, wherein the instructions are further executable by the processor to cause the apparatus to:

update the value of the state variable corresponding to the highest sequence number with the sequence number associated with the RLC SDU segment or with a number greater than the sequence number associated with the RLC SDU segment.

19. The apparatus of claim 18, wherein the value of the state variable is initially set to zero.

20. The apparatus of claim 19, wherein the instructions are further executable by the processor to cause the apparatus to:

determine that the sequence number associated with the RLC SDU segment is greater than zero.

21. The apparatus of claim 15, wherein the reassembly timer comprises a t-reassembly timer or a t-reordering timer.

22. A non-transitory computer readable medium storing code for wireless communication, the code comprising instructions executable by a processor to:

receive, at a radio link control (RLC) layer, an RLC service data unit (SDU) segment of a protocol data unit (PDU);

determine that a sequence number associated with the RLC SDU segment is greater than a value of a state variable corresponding to a highest sequence number associated with previously received PDUs or previously received RLC SDU segments;

determine that buffered RLC SDU segments associated with the same sequence number as the received RLC SDU segment are received out of order; and update the value of the state variable corresponding to the highest sequence number and initiating a reassembly timer based at least in part on the determination that the sequence number associated with the RLC SDU segment is greater than the value of the state variable and the determination that buffered RLC SDU segments associated with the same sequence number as the received RLC SDU segment are received out of order.

23. The non-transitory computer-readable medium of claim 22, wherein the instructions are further executable by the processor to:

determine that a first byte of the sequence number associated with the received RLC SDU segment is not in a receive buffer at the RLC layer.

24. The non-transitory computer-readable medium of claim 22, wherein the instructions are further executable by the processor to:

determine that the buffered RLC SDU segments with the same sequence number are not in consecutive byte order.

25. The non-transitory computer-readable medium of claim 22, wherein the instructions are further executable by the processor to:

update the value of the state variable corresponding to the highest sequence number with the sequence number associated with the RLC SDU segment or with a number greater than the sequence number associated with the RLC SDU segment.

26. The non-transitory computer-readable medium of claim 25, wherein the value of the state variable is initially set to zero.

27. The non-transitory computer-readable medium of claim 26, wherein the instructions are further executable by the processor to:

determine that the sequence number associated with the RLC SDU segment is greater than zero.

28. The non-transitory computer-readable medium of claim 22, wherein the reassembly timer comprises a t-reassembly timer or a t-reordering timer.

* * * * *